Jan. 10, 1967  P. W. JOHNSON  3,296,705
GAGE WITH AXIALLY MOVABLE OPERATING MEANS
Filed July 29, 1963                                                3 Sheets-Sheet 1

INVENTOR.
PAUL W. JOHNSON
BY
John M Montstream
ATTORNEY

Jan. 10, 1967 P. W. JOHNSON 3,296,705
GAGE WITH AXIALLY MOVABLE OPERATING MEANS
Filed July 29, 1963 3 Sheets-Sheet 2

INVENTOR.
PAUL W. JOHNSON
BY
John M Montstream
ATTORNEY

Jan. 10, 1967  P. W. JOHNSON  3,296,705
GAGE WITH AXIALLY MOVABLE OPERATING MEANS
Filed July 29, 1963  3 Sheets-Sheet 3
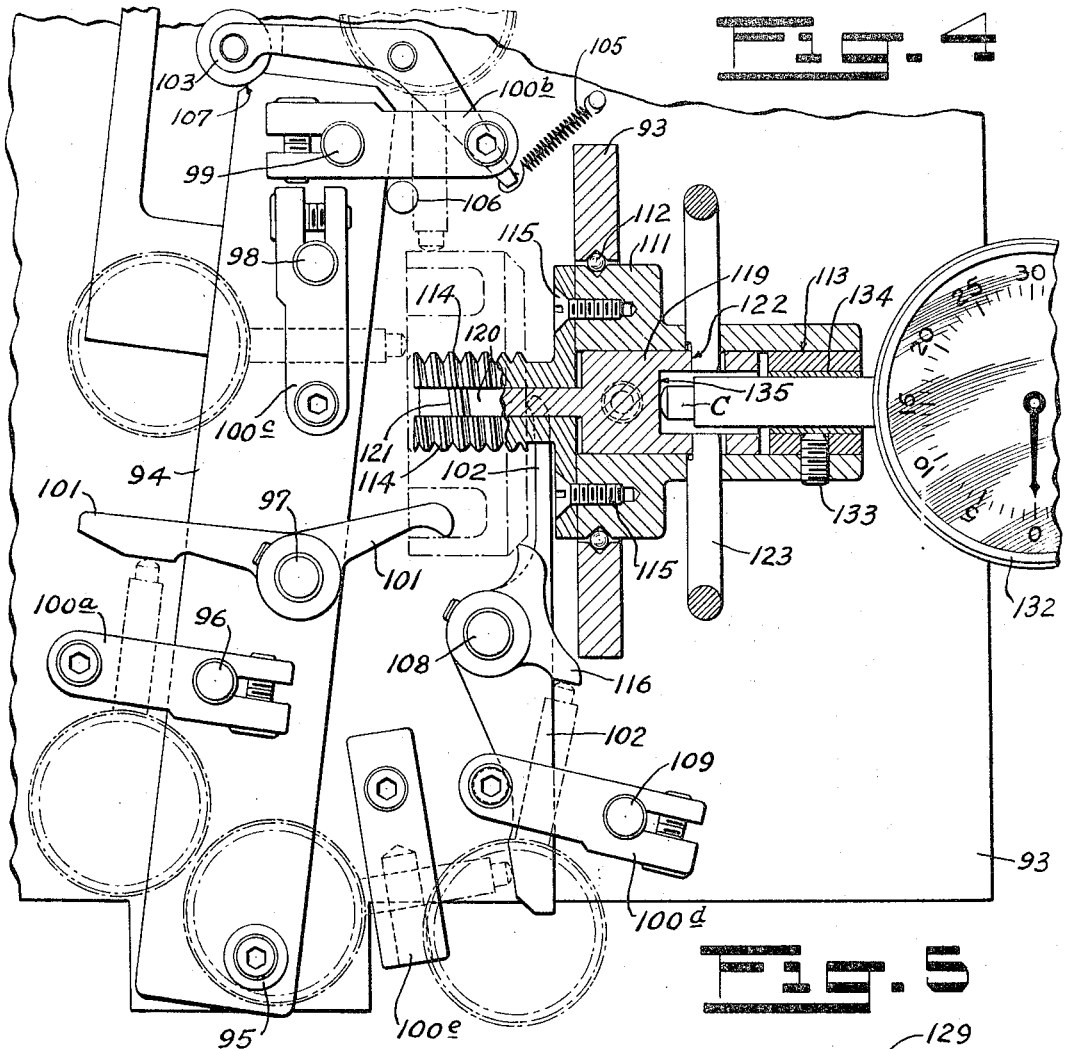
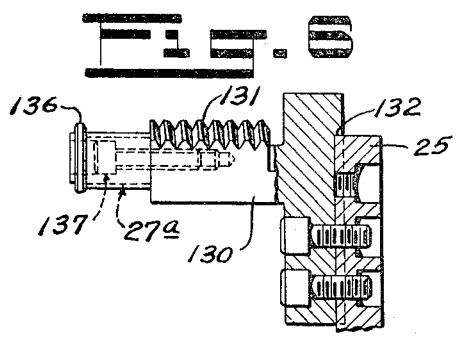
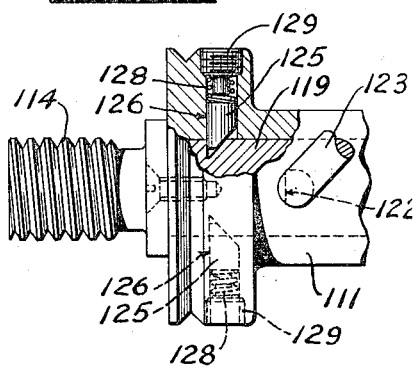
INVENTOR.
PAUL W. JOHNSON
BY
John M. Montstream
ATTORNEY United States Patent Office 3,296,705
Patented Jan. 10, 1967

3,296,705
GAGE WITH AXIALLY MOVABLE OPERATING MEANS
Paul W. Johnson, Bloomfield, Conn., assignor to The Johnson Gage Company, Bloomfield, Conn., a corporation of Connecticut
Filed July 29, 1963, Ser. No. 299,682
3 Claims. (Cl. 33—174)

The invention relates to a gage for measuring a threaded part as well as other components related to the thread and is a continuation-in-part of application S.N. 831,757 filed August 5, 1959, now abandoned, and also has been restricted to specific claims directed to the construction of FIG. 1. The components gaged may be such as the centricity of a conical and/or cylindrical surface or bore with respect to the thread and the squareness of one or more faces with respect to the thread. The invention also relates to a gage for measuring the accuracy of a groove or a screw thread groove as well as a combination of the groove or thread with other structure related thereto to determine the relative acceptability as to centricity, squareness and other factors which may be desirable to be tested on a test part. One of the thread gages also tests for lead of the thread.

It is an object of the invention to construct a thread gage of simple construction which determines the acceptability of a screw thread and also uses the thread gaging means as holding means for the test part for determining other characteristics of the test part such as squareness of one or more surfaces, centricity of one or more surfaces including a taper, a cylindrical bore and a cylindrical surface with respect to the thread.

Another object is to construct a gage for rotatably mounting a test part and having a pivotal frame for carrying one or more indicators which frame is pivoted into and retained in gaging position to determine other characteristics or components of the test part.

Another object is to construct a gage for testing the accuracy of a groove by axial movement of one gage part with respect to another.

A still further object is to construct a simple gage to test a thread and to test the thread for lead error.

Another object is to construct a gage for a groove such as a thread and the like using spring pressure effectively as the gaging pressure and with ball bearing mounting for freedom of movement and shake free.

Another object is to provide a gage using a segment and a pitch diameter gaging element.

Another object is to construct a gage which can easily be reset to gage either an internal or external surface.

Other objects of the invention will be more apparent from the following description when taken in connection with the accompanying drawings illustrating preferred embodiments thereof in which:

FIG. 4 is a longitudinal section through the thread gaging portion of the gage of FIG. 3 and shows some of the indicators for testing centricity and squareness with respect to the thread;

FIG. 5 is a section of a part of the gage of FIG. 4;

FIG. 6 is a view of a gaging segment with a pitch diameter gaging element carried thereby.

Figure 1:
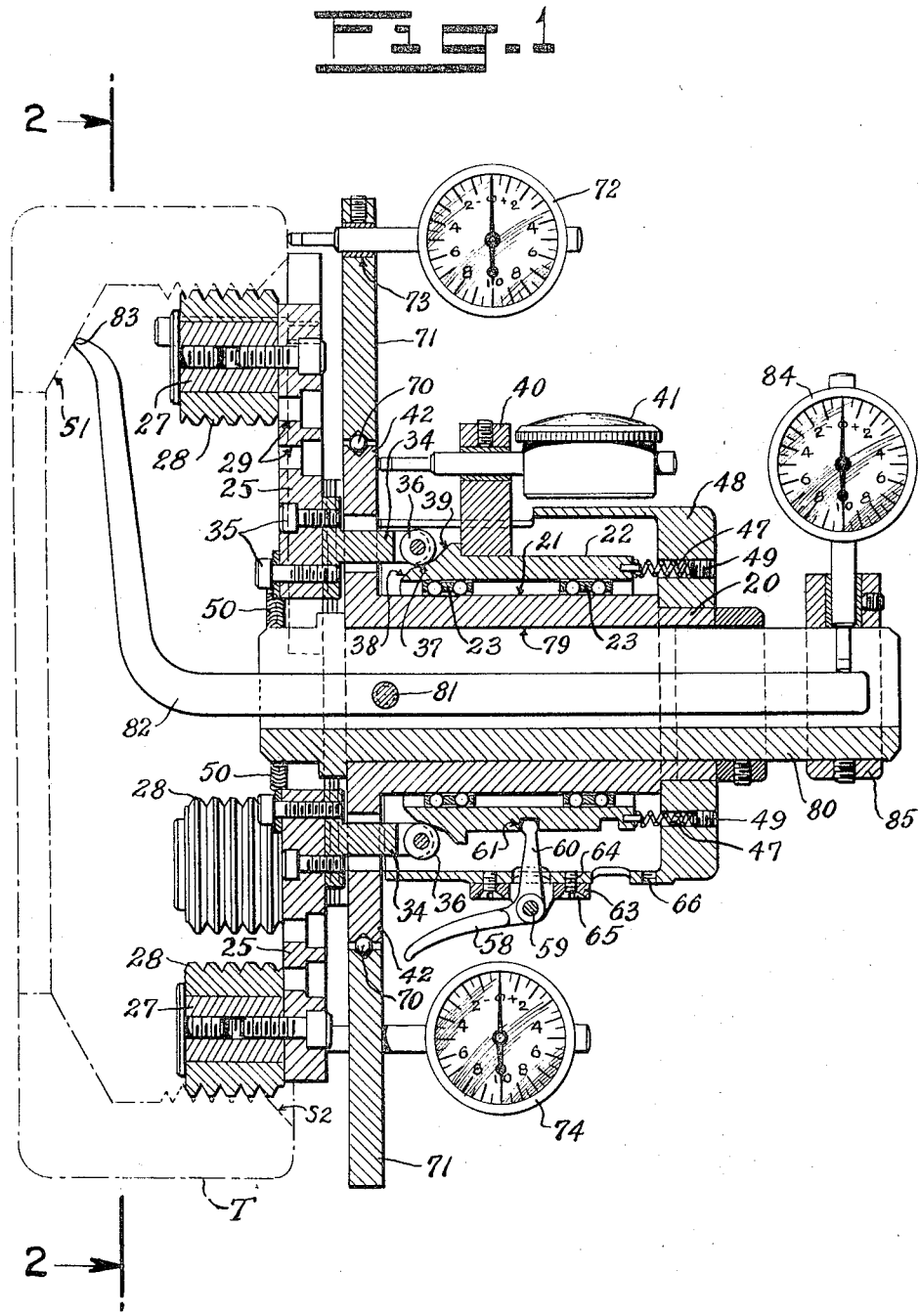
FIG. 1 is a longitudinal section through a gage primarily for large diameter screw threads.
Figure 2:
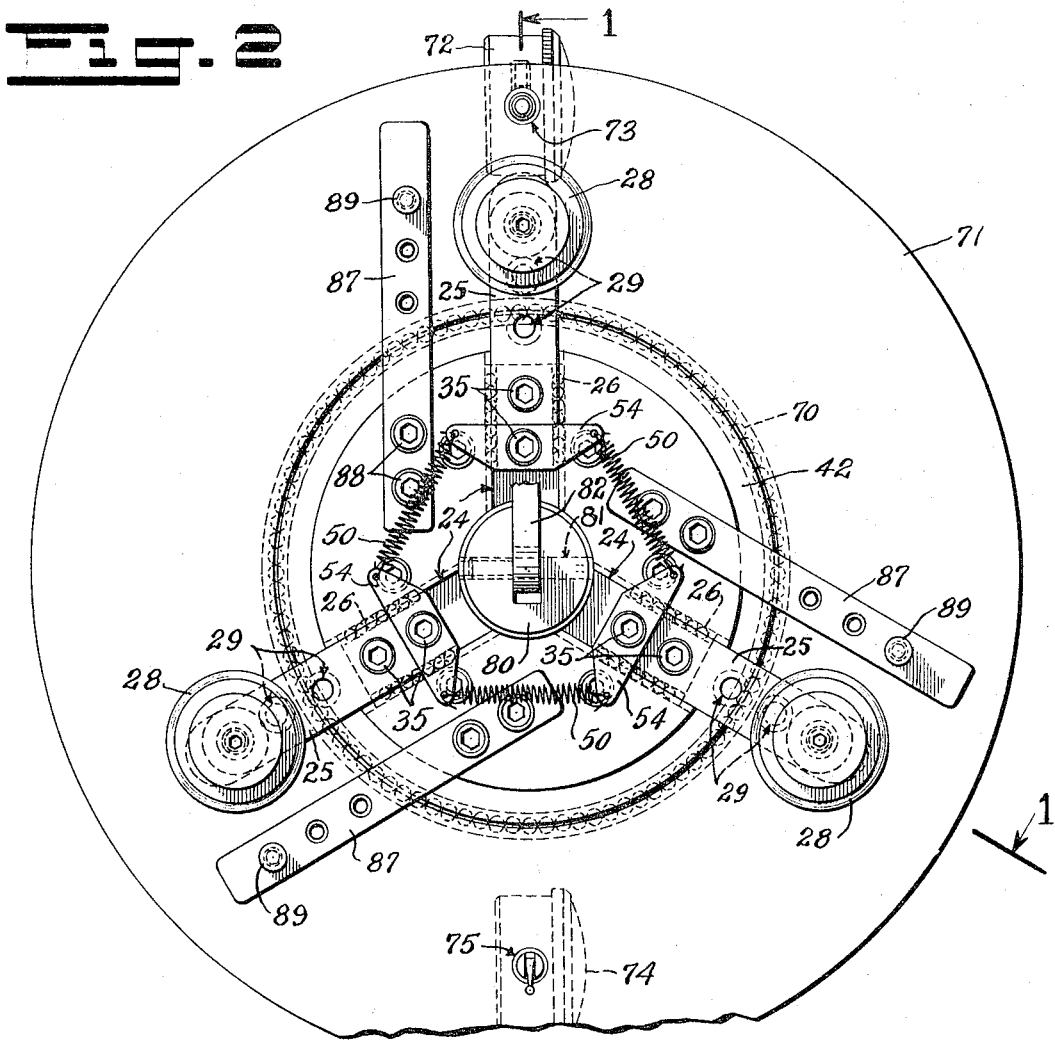
FIG. 2 is an end view of the gage of FIG. 1 as taken on line 2—2.

The gage shown in FIGS. 1 and 2 is shown as a thread gage having a frame 20 which has an axial bearing 21 on the outer surface. An axially movable operating member 22 is mounted on the bearing such as by ball bearings 23. The frame carries also, a plurality of radial guides or guideways 24 in each of which is mounted a radial arm 25 preferably using balls 26. Three such guides and arms are shown. Each arm carries a stud 27 on which is carried a gaging element 28, such as a roll which for a thread would have thread gaging ridges and for a plain surface would be plain surfaced rolls. A series of spaced holes 29 may be provided in each arm for changing the location of the gaging rolls or elements for different diameters of test parts.

Operating means are provided to propel the gaging means for contact with a thread which includes the operating member 22, the axial motion of which is transmitted to the radial arms 25 through a projection 34 secured to each arm such as by screws 35 which projection carries a roller 36. This roller engages an inclined or conical surface 37 preferable carried at the end of the operating member 22. For direct reading and test of diameter, it is necessary that a radial movement of one unit for each gaging means be secured through a two unit axial movement of the operating member 22 and hence the angle of the inclined surface will be about 26 degrees 34 minutes, or particularly the tangent of which angle is .500. It is desirable to have steeper angle conical surfaces 38 and 39 at each end of conical surface 38 for rapid expansion and contraction of the gaging means, the surface 38 being for internal gaging and surface 39 for external gaging.

The movement of the operating member 22 with respect to the frame or frame member 20 is measured by an indicator carried by one of the parts including the frame member and the operating member and engaging the other member. The means particularly shown includes a bracket 40 carried by the operating member 22 to which bracket an indicator 41 is secured, the contactor C of which engages the frame or particularly a flange or ring 42 carried thereby.

Means are provided to propel the gaging means radially either inwardly or outwardly. The propelling means shown includes spring means, preferably two or more springs 47, carried by a frame part, such as a cap 48 secured to the frame such as by a drive fit and engaging the operating member 22 to press the operating member to the left, as particularly shown. The springs press the arms and the gaging means radially outwardly by the rolls 36 riding on the inclined or conical surface 37. Screws 49 may be used to adjust the tension of springs 47. The operating means also includes spring means to propel the arms inwardly so that the rolls 36 are held in contact with the inclined or taper surface 37. The spring means shown includes springs 50 secured to the arm such as by being attached to the lugs 54 carried by the arms, there being three springs particularly shown since there are three radially movable arms 25. The springs 50 are particularly attached to lugs of adjacent arms as a convenient method of attachment and operation.

For an internal gage as particularly shown the springs 47 will be made stronger than the springs 50 so that normally the gaging means are propelled outwardly for engagement with an internal surface of a test part. By having the springs 50 stronger than the springs 47, such as decreasing the compression of the latter, the spring means will normally propel the gaging means inwardly to engage the outer periphery of a test part or thread.

The operating means also preferably includes a lever to move the operating member 22 axially with respect to the frame 20. To this end, a lever 58 is pivotally mounted on a pivot 59 carried by the frame and particularly by the cap 48, the lever having a finger 60 which engages in a hole 61 in the operating member. Pressing the lever 58 inwardly shifts the operating member 22 to the right so that the arms and gaging rolls are contracted inwardly. The pivot 59 is carried by a mounting plate 63 secured to the cap 48. If it is desired to convert the gage to an external gage, the plate 63 and hence the lever 58 is turned around to project in the opposite direction with the screws 65 in the holes 66 so that inward movement of the lever 58 propels the operating member 22 to the left which propels arms 25 and gaging means 28 outwardly whereupon release of the lever causes springs 50 which are stronger than springs 47, to pull the arms and gaging means inwardly against an external surface or thread.

Frequently with a test part, it is desirable to determine centricity of one or more other surfaces with respect to the thread or surface being tested. To secure this additional gaging test or information, the frame carries a circular mounting means 70 shown particularly as a ball groove on which may be mounted a base or base member 71. This member carries at least one indicator 72 which is secured in a hole 73 and the contact point of the indicator is shown in contact with the end surface of the test part T. The base also may have a second indicator hole 75 and an indicator 74 therein engaging a taper surface S2 carried by the test part. With the gaging rolls or elements engaging the test part and holding it stationary, the base 71 may be rotated on the frame and by watching the indicators 72 and 74 the centricity of these surfaces with respect to the thread or internal surface may be tested. For a portable test part, as particularly shown, the base rotates with respect to the frame, however, the base may in fact be a base to rest on a bench, in which event rotation of the frame 20 and the test part with respect to the base will test for squareness and centricity of the surfaces with respect to the thread as to indicators carried on the base.

In addition the gage is constructed so that centricity of an inner surface or surfaces may be tested with respect to an internal surface or particularly a screw thread. For this operation the frame carries a bearing hole 79 which receives a stem 80 suitably mounted for rotation therein. The stem carries a pivot 81 on which is mounted a gaging lever 82 and this gaging lever has an inner contact end 83 for engaging an internal surface S1 which may be in a large sized casting or a test part with an enclosed end. The other end of the gaging lever extends to the outer end of the stem. The stem 80 carries a mounting bracket 85 for an indicator 84, the contact point of which engages the outer end of the gaging lever 82. By rotating the stem 80, the indicator 84 will test or the centricity of the surface S1 with respect to the screw threads. It is clear that this lever will also test for the squareness of a flat internal surface with respect to the screw thread.

In order to aid in mounting a test part such as a ring T on the gaging means or thread gaging rolls of the gage, and to aid in initially aligning the ring with respect to the gaging means, the frame may carry auxiliary mounting means in the form of fixed arms 87 secured thereto by screws 88 and having projecting pins 89. The outer surfaces of the pins approximately correspond with or are a little less than the diameter of the internal surface or thread to be gaged.

Figure 3:
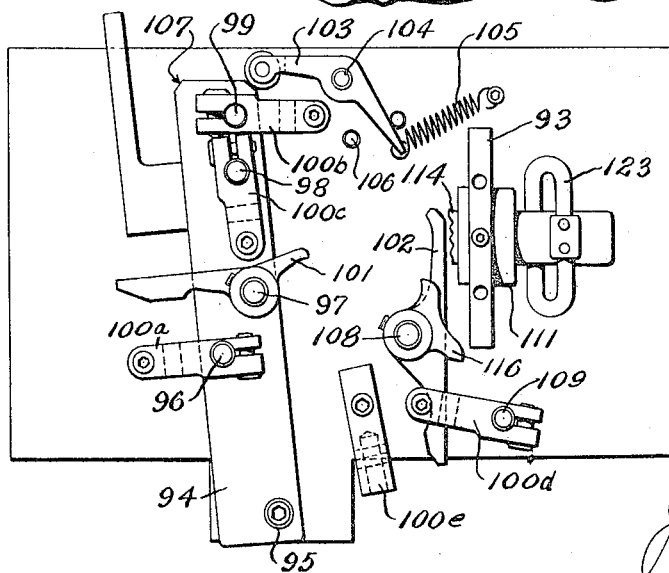
FIG. 3 is a top view of a base for a thread gage for smaller diameters.

FIG. 3 shows a gage in many ways structurally similar to that illustrated in FIGS. 1 and 2 for testing small diameters of test parts. This gage has a thread gaging means different from that of the construction of FIG. 1 and will be described herein-after. In this construction, a base 93 rotatively receives a frame. The base 93 carries a pivoted lever 94 mounted on a pivot 95 carried by the base. At least one indicator mounting means is carried by the pivoted lever which includes a mounting pin of which four are shown namely 96, 97, 98 and 99 and indicator brackets 100. Three of the mounting pins are shown as carrying an indicator bracket for receiving or supporting an indicator. One of the mounting pins 97 carries a transfer lever 101 which is pivotally mounted on the pin, one end of which lever is adapted to engage a surface of a groove in the test part to test the centricity of the surface with respect to the thread. An indicator is carried by the bracket 100a on the pin 96 and engages the other end of the transfer lever. An indicator carried by the bracket 100b carried by the mounting pin 99 may be positioned to engage the periphery of the test part to test the accuracy thereof and the centricity thereof with respect to the thread. A second indicator mounted on a bracket 100c on the mounting pin 98 may engage the end surface of the test part to test its dimension and squareness with respect to the thread. Many variations may be made in the use of this pivoted frame.

Means are provided to hold the pivoted frame 94 in gaging position adjacent to the thread gaging means, the means particularly shown includes a holding lever 103 pivotally mounted on a pin 104 and propelled by a spring 105. The mounting lever when in gaging position, engages a locating stop 106 carried by the base and the holding lever then engages the back end of the pivoted frame or particularly an angular surface 107 thereon so that the frame is held against the stop by the spring. By pressing the pivoted frame to the left, the holding lever is released and the indicators are swung away from the test part so that it may be removed from the thread gaging means which also serve as holding means for the test part when rotating the frame and the test part. The base may carry other indicator mounting means such as mounting pins 108 and 109. The pin 108 mounts a transfer lever 102 for engaging an end surface of the test part and a second transfer lever 116 for engaging a taper surface on the test part. The pin 109 mounts an indicator bracket 100d for an indicator for engaging the second transfer lever 116. Another bracket 100e is carried by the base to mount an indicator to engage the transfer lever 102.

FIG. 4 shows the construction of a thread gaging means which may be mounted on the base 93. It includes a frame or frame member 111 having a bearing for rotatably mounting the same on the base, the particular means shown being balls 112, received in ball grooves carried by the frame and the base. The frame carries a guide or guideway 113 for mounting the operating means for axial movement on the frame. The guide in this construction constitutes a central bore. Fixed thread gaging means or elements 114 are secured to the frame in spaced relation such as by screws 115. The thread gaging means 114 are of a diameter to receive the smallest diameter of test thread so that if the test part does not thread thereon the thread is known to be too small. To test for oversize of an internal thread of a test part the guide 113 carries an axially movable operating member 119 forming a part of the operating means. The operating member carries an axially movable gaging means 120 which is received and slidable axially in the space between the fixed thread gaging means 114. This operating member carries on its periphery cooperating thread gaging means shown particularly as a single thread gaging ridge 121 on opposite sides.

Operating means are provided to shift the operating member 119 axially and hence to axially shift the cooperating ridge 121. The means particularly shown includes a cam means 122 shown as flats on an operating lever 123 which is pivotally mounted in holes 124 carried by the frame. Upon pressing the lever 123 downwardly the cam means 122 propels the operating member 119 to the left to bring the cooperating gaging ridges 121 into alignment with one of the thread spirals of the gaging members 114. The operating means also include spring means for propelling the operating member and the thread ridges 121 in the opposite direction or to the right which means is shown as taper means or pins 125 on opposite sides of the frame slidably mounted in a laterally extending bearing or hole 126 and engaging a taper surface 127 in the operating member 119. The taper member 125 is pressed radially inwardly by a spring 128, the compression of which may be adjusted by a screw 129 which backs up the spring.

Indicator means is carried by one of the members including the frame 111 and the operating member 119 and engaging the other member to indicate the position of one member with respect to the other and thereby indicate whether or not the test part is within the allowable tolerances. In the construction particularly shown an indicator 132 is secured to the frame 111 such as by a screw 133 which deforms a bushing 134 to grip the stem of the indicator. The contactor C of the indicator engages the operating member 119 at the bottom of a hole 135 so that the relative position of the operating member and its co-operating gaging ridges 121 with respect to the frame and the gaging means 114 is indicated to provide a test as to the accuracy of the thread.

In operation, the thread gaging ridges 121 are brought into alignment with the adjacent one of the thread ridges on the fixed gaging members 114 by depression of the lever 123 and upon its release the springs 128 presses the operating member to the right and brings the cooperating thread gage ridges 121 into contact with the right hand flank of the test thread. If the indicator shows that the thread groove is too wide, the indicator 132 will give a reading outside of the desired tolerance limits. If the test thread is within the desired limits, the indicator pointer will come within the tolerance limits allowed for the test thread.

The gage will also indicate any error in lead by watching the indicator as the test part is threaded on the fixed gaging means 114. By noting the reading when the first thread of the test part is engaged by the gaging ridge 121 and upon continued rotation of the test thread onto the fixed thread gaging members 114 and noting changes in the indicator reading, which indicates changes in relative position of the ridge 121 for succeeding threads. If the reading on the indicator varies, this shows that the lead of the thread is faulty. An increasing reading on the indicator will show a long lead and a decreasing reading will show a short lead.

The gage of FIG. 4 when mounted on the base of FIG. 3, provides a thread gage as well as a holding means for a test part. When the thread has been gaged, the test part is advanced until an indicator such as an indicator reading from the transfer lever 102 shows zero. Then by rotating the thread gaging means and the test part held thereby the centricity or squareness of other surfaces of the test part with respect to the thread is determined. If the indicators do not change then the particular surface is square or concentric with the thread.

The gage as shown in FIGS. 3 through 5 may be disconnected from the base 93 by removal of the balls 112 from the ball race or groove and serve as a hand gage for testing the thread of a test part or it may be conveyed to a threaded hole in a large casting and an on the job check of any such thread may be made. With the gage mounted on the base of FIG. 3 the thread gaging means also constitutes means for holding the test part. Rotation of the thread gaging means and of the test part held by the thread gaging means while mounted on the base, various tests may be made as to squareness and centricity of various surfaces with respect to the thread. The thread gaging means grips the test part sufficiently so that it remains set thereon and does not shift so that the test part when rotated will operate various other indicators carried by the base to test other surfaces of the test part with respect to the thread.

In order to assure uniformity in the gaging of test parts irrespective of the person using the gage, the pressure applied on the gaging elements or means should be uniform for each gaging operation. This is assured by using spring means to press the gaging means into contact with the test part or thread. The spring means 47 of FIG. 1 is given a desired compression such as through the screws 49, or tension, after which the spring pressure is constant for every test part. There is no uniformity in the pressure applied by different operators of a gage when making each gaging operation and there is lack of uniformity of pressure applied by a single operator for successive gaging operations. This non-uniformity in an operator or operators is therefore avoided by the gage using spring means to bring the gaging means into contact with the test surface or thread. Because spring means is the moving agent for the operating member and the gaging element or elements when gaging, it is desirable to use a ball bearing mounting for all movable parts such as bearing 23 for the operating member 22, and a ball bearing mounting 26 for each of the movable radial arms 25. This gives freedom or ease of movement of these parts under the pressure of the spring means. Each ball bearing mounting includes the balls and cooperating ball surfaces such as the surfaces of the ball grooves for the radial arms and the internal surface of the operating member 22 and the external surface of frame member 20.

For accuracy in gaging, it is necessary that there be no play or shake in any of the moveable parts of the gage. Usual ball bearings will not assure that there will be no play or shake in these movable parts. In order to assure the accuracy of the gage and still retain freedom of movement, the balls are selected such that they are over-sized for the space receiving them between cooperating ball surfaces and must be pressed or lightly forced into the ball bearing space between cooperating ball surfaces. The balls are under constant compression when mounted. The balls are selected so that they have a diameter of about one ten-thousandths of an inch to two-ten-thousandths of an inch larger that the dimension of the space receiving the balls or larger by such amount than the ball which normally would be used between the cooperating ball surfaces. The size of ball found most suitable is one and a half ten thousands of an inch larger than the space in which they are received. Even though the balls are oversize, there is no signfiicant difference in the ease or freedom with which the parts move under the pressure of spring means. The over-sized balls do assure that there is no play or shake in any of the moveable parts with the result that the gage is accurate.

The gaging roll 28 illustrates one type of gaging element. A gaging segment 130 having a gaging surface 131 may be substituted for each gaging roll such as the gaging segment of FIG. 6. Such gaging segments give a more accurate test of the overall assemble-ability of a thread of the test part with its mating thread than is provided by the use of gaging rolls. This is because of the greater thread contact. Also a pitch diameter thread gaging element may be carried by each gaging segment for determining the accuracy of this diameter of the test thread. The pitch diameter gaging element particularly shown is a roll 136, although it need not be this form. A roll is more desirable because of the fact that the small area of contact of the pitch diameter gaging element, which is not a roll, normally will wear much faster than the gaging surface of the segments. The rotatable pitch diameter roll which normally turns in use, assures use of the full periphery and that the life of, or the wear on, this roll and the segments will be more nearly the same from constant gaging use. The pitch diameter gaging roll is mounted on an eccentric stud 27a which is secured to the segment by a screw 137 so that its position may be adjusted to proper position with respect to the thread gaging surface of its segment. The segment may have a suitable locating shoulder 132. The segment particularly illustrated with its convex gaging surface, is for gaging internal threads. For segments for gaging an external thread, the gaging surface or thread of the segment will be a concave gaging surface.

In using the gage with a segment alone, the operation of the gage is identically the same as operation with the gaging rolls 28. In using the gage with pitch diameter gaging elements carried by and spaced forwardly from the segment, the pitch diameter gaging elements 136 solely, will be brought into contact with the test thread to determine the pitch diameter. If the first thread of the test part is gaged by the pitch diameter gaging elements and then the last thread of the test part is gaged and the indicator reading obtained from each reading is different, it shows a taper in the thread. After the test thread has been gaged so far as pitch diameter and taper is concerned, the gage is contracted to bring the gaging surface of the gaging segments 130 into alignment with the test thread and then expanded to engage the test thread. The indicator reading will then determine the over-all assemble-ability of the test thread with respect to its mating thread. This gage can be used with test parts such as rings or threads which provide sufficient clearance at the far end of the thread so that there will be no interference of the pitch diameter gaging means with the test part when the segments are engaging the thread.

This invention is presented to fill a need for improvements in gage with axially moveable operating means. It is understood that various modifications in structure, as well as changes in mode of operation, assembly, and manner of use, may and often do occur to those skilled in the art, especially after benefiting from the teachings of an invention. This disclosure illustrates the preferred means of embodying the invention in useful form.

I claim:

1. A gage for a test part with a groove having opposite surfaces and adapted to carry at least one indicator having a contactor comprising a frame member, an axially extending guideway carried by the frame member, a plurality of radially extending guideways carried by the frame member, gaging means mounted in each radial guideway and moving radially thereon, each gaging means including a gaging element with a gaging surface, operating means including an operating member mounted on the guideway for axial movement and having an axis, a taper surface carried by the operating member and having an angle of 26°, 34′, the taper surface engaging each gaging means to operatively connect the same with the operating member, a first spring means propelling the operating member axially along the guideway and in a direction to propel the gaging means into contact with the groove of the test part, a second spring means engaging the gaging means to propel the same away from contact with the test part when the first spring means is contracted and manual means connected with the operating member to move the same against the spring means to release the test part; each gaging means moving radially an equal amount to engage the groove to gage the same and to centralize the groove of the test part with respect to the axis of the operating member, ball bearing mounting means including balls and cooperating ball surfaces mounting at least the radially movable gaging means of the gage, the balls being oversized by about one and a half ten-thousandths of an inch for the ball spaces between cooperating ball bearing surfaces and requiring pressure for their insertion into the ball spaces, and indicator mounting means carried by one member and located to have the indicator contactor engage the other member for indicating the relative position of the members and the gaging means the frame member having an axial hole extending therethrough, the stem rotatably mounted in the hole, a lever pivotally mounted on the stem and projecting from the inner end of the frame and extending to the outer end thereof, and indicator mounting means carried by the stem in a position to have the indicator contactor engage the lever.

2. A gage as in claim 1 including a base member, a circular bearing carried by the frame member and the base member to rotatably mount one on the other, and at least one indicator mounting means carried by the base member.

3. A gage for a test part with a groove having opposite surfaces and adapted to carry at least one indicator having a contactor comprising a frame member, an axially extending guideway carried by the frame member, a plurality of radially extending guideways carried by the frame member, gaging means mounted in each radial guideway and moving radially thereon, each gaging means including a gaging element with a gaging surface, operating means including an operating member mounted on the guideway for axial movement and having an axis, a taper surface carried by the operating member and having an angle of 26°, 34″, the taper surface engaging each gaging means to operatively connect the same with the operating member, a first spring means propelling the operating member axially along the guideway and in a direction to propel the gaging means into contact with the groove of the test part, a second spring means engaging the gaging means to propel the same away from contact with the test part when the first spring means is contracted, and manual means connected with the operating member to move the same against the spring means to release the test part; each gaging means moving radially an equal amount to engage the groove to gage the same and to centralize the groove of the test part with respect to the axis of the operating member, ball bearing mounting means including balls and cooperating ball surfaces mounting at least the radially movable gaging means of the gage, the balls being oversized by about one and a half ten-thousandths of an inch for the ball spaces between cooperating ball bearing surfaces and requiring pressure for their insertion into the ball spaces, and indicator mounting means carried by one member and located to have the indicator contactor engage the other member for indicating the relative position of the members and the gaging means, a gaging segment with thread gaging surfaces, and including a pitch diameter gaging means secured to each segment and spaced outwardly therefrom.

References Cited by the Examiner

UNITED STATES PATENTS

| | | | |
|---|---|---|---|
| 2,258,760 | 10/1941 | Hecker | 33—199 |
| 2,434,535 | 1/1948 | Anders | 33—199 X |
| 2,595,917 | 5/1952 | Bath et al. | 33—178 |
| 2,630,633 | 3/1953 | Webb. | |
| 2,700,224 | 1/1955 | Johnson | 33—199 |
| 2,806,294 | 9/1957 | Cargill | 33—199 |
| 2,817,154 | 12/1957 | Swanson | 33—174 X |
| 2,872,739 | 2/1959 | Johnson | 33—199 |

OTHER REFERENCES

Allan: Rolling Bearings, Pitman Publishing Corp., N.Y., Second Edition, 1946, pages 235–237.

LEONARD FORMAN, *Primary Examiner.*

LOUIS R. PRINCE, ISAAC LISANN, *Examiners.*